No. 609,814. Patented Aug. 30, 1898.
G. KOSER.
PRODUCING ICE.
(Application filed Nov. 21, 1896.)
(No Model.)
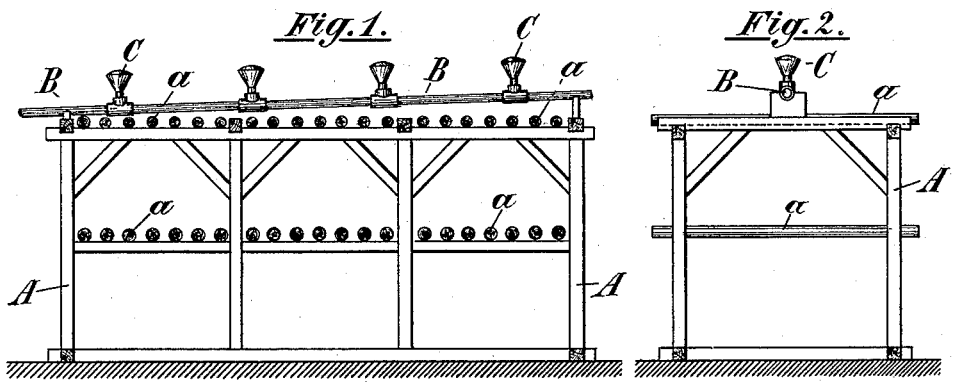
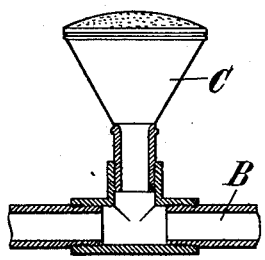
Witnesses:
M. C. Massie.
H. Mitchell.
Inventor:
Georg Koser,
by Max Ziegü
Attorney.

UNITED STATES PATENT OFFICE.

GEORG KOSER, OF GEISLINGEN, GERMANY, ASSIGNOR TO HEINRICH BECHMANN, OF BAMBERG, GERMANY.

PRODUCING ICE.

SPECIFICATION forming part of Letters Patent No. 609,814, dated August 30, 1898.

Application filed November 21, 1896. Serial No. 612,925. (No model.)

*To all whom it may concern:*

Be it known that I, GEORG KOSER, residing at Geislingen-on-the-Steig, Würtemberg, Germany, have invented new and useful Improvements in Apparatus for Producing Ice, of which the following is a specification.

My invention relates to an improvement in ice-making apparatus.

The object of my invention is to provide an apparatus by which water can be frozen into merchantable ice at a temperature but little, if any, below the freezing-point of water—viz., 32° Fahrenheit.

It is well known that if water be sprayed downward in a finely-divided condition into a temperature somewhat below the freezing-point and allowed to fall upon some object—such as a floor, vertical wires, walls, or cooling-coils—it will be congealed upon such object and finally accumulate in the form of blocks, sheets, &c., of ice. My invention, as contradistinguished from such previously-known methods and apparatus, consists in a structure by means of which the water is sprayed upward in a finely-divided condition against the force of gravity and away from the objects upon which it is intended to fall and congeal, these objects, furthermore, consisting of horizontally-arranged rods or pipes located beneath the spraying-device.

By this improvement the water is sprayed upward, thereby moving with a retarded velocity at first until it reaches the highest point of travel, whereupon it descends until it reaches the horizontally-arranged pipes or rods, upon which it congeals. In those structures where the water is sprayed downward it leaves the orifices in the sprayer under pressure, which gives it a rapid initial movement, while at the same time the acceleration due to gravity moves it still more rapidly. The result of this is that the arrival of the sprayed water at the object upon which it is to congeal occurs almost directly upon its departure from the sprayer, so that there is not sufficient time for the spray to be subjected to the cold temperature of the atmosphere, and hence it falls on the object upon which it is to congeal without having had its temperature sufficiently reduced in order to congeal unless the temperature of the air through which it has fallen is considerably below the freezing-point of water. By my construction, on the other hand, the spray rising from the sprayer gradually loses the momentum imparted by the pressure in the water-pipes and toward the latter portion of its upward movement travels exceedingly slow until it has reached its maximum height, after which it commences to descend, and in this descent, being without any initial movement due to hydraulic pressure, it travels much slower than it otherwise would. Hence without an unnecessary and inconvenient increase in the height of the building the spray is subjected to the cold atmosphere for a longer time and thus reaches the horizontal rods in a colder condition, and, indeed, as I have found, in practically a congealed condition, so that it immediately solidifies upon such horizontal rods to form cakes or sheets, and at a temperature closer to the freezing-point than is the case where it is sprayed downward. Furthermore, it is not possible in the old constructions where the spray is thrown downward to increase the distance through which the spray must fall and thereby obtain results equivalent to those obtained in my apparatus, for the reason that where considerable distance is traveled by the spray the globules of water travel with such a high velocity during the latter portion of their descent that instead of being reduced in temperature the heat generated by the friction of the air defeats the object sought.

My invention will now be described in connection with the accompanying drawings, and then particularly pointed out in the claims.

In the drawings, Figure 1 is a side elevation of an apparatus embodying my invention; Fig. 2, an end elevation of the same, and Fig. 3 a detail sectional view of one of the sprinkler devices.

Referring to the drawings, A is a framework of any suitable construction intended to support a sprinkling apparatus adapted to deliver the spray upward and a series of horizontally-arranged rods or pipes *a*, these being the objects upon which the spray congeals to form solid blocks.

The sprinkling apparatus consists of a plurality of sprinkler-heads C, projecting upward and supplied with water from a branch pipe B, which conducts the water from a suitable source. (Not shown.) The sprinkling apparatus is located above the rods $a$, upon which the ice is formed.

The operation of my device is as follows: The water escaping from the sprinkler-heads rises against the action of gravity with a gradually-retarded velocity until the momentum due to the water-pressure is overcome, after which it descends, moving slowly at first, but of course with accelerated velocity, and reaching the rods $a$ before it has fallen a distance adequate for its velocity to become great enough to generate friction sufficient to prevent or interfere with the freezing process. Hence by this delayed movement first upward and then downward the spray is reduced in temperature, so that immediately upon striking the rods it congeals upon the same and accumulates to form a block or sheet of ice without there being any surplus uncongealed water to drip off and thus cause a loss in the operation of the apparatus. After an extended operation the rods become covered with ice, which extends across and around all the rods in a solid cake, this cake or sheet, however, be it noted, growing larger only above the rods and not increasing in thickness upon the under side of the rods, whereby it results that when the sheet or cake of ice is of the desired thickness for use it may be removed, together with the rods, and the latter being only slightly embedded in the lower side of the cake may readily be removed by a sharp blow, bearing creases or grooves, which by a proper spacing of the rods in the framework A serve admirably to assist in properly dividing the ice into the desired smaller block or cakes.

Having thus fully described my invention, what I claim as new, and desire to secure by Letters Patent of the United States, is—

1. In an apparatus for making ice, the combination, with a spraying device arranged to project its spray upward, of rods below the spraying device and arranged to receive the congealed water formed by the freezing of the spray.

2. In an apparatus for making ice, the combination with a spraying device arranged to project its spray upward, of a series of horizontally-arranged rods located below the spraying device and arranged to receive the congealed water formed by the spray.

In testimony whereof I have signed this specification in the presence of two subscribing witnesses.

GEORG KOSER.

Witnesses:
 AUGUST DRAUTZ,
 CHRISTIAN BAUER.